(12) United States Patent
Hayashi et al.

(10) Patent No.: US 7,407,031 B2
(45) Date of Patent: Aug. 5, 2008

(54) ALL TERRAIN VEHICLE (75) Inventors: Tomoyuki Hayashi, Shizuoka (JP); Masayuki Uchiyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 484 days.

(21) Appl. No.: 11/142,635

(22) Filed: Jun. 1, 2005

(65) Prior Publication Data

US 2006/0272879 A1 Dec. 7, 2006

(51) Int. Cl.
*B62D 21/00* (2006.01)
(52) U.S. Cl. .................. 180/311; 180/291; 180/312
(58) Field of Classification Search ............ 280/93.512, 280/781; 180/291, 311, 312
See application file for complete search history.

(56) References Cited

U.S. PATENT DOCUMENTS 5,284,221 A * 2/1994 Warne .................. 180/219
6,702,058 B2 * 3/2004 Ishii et al. .............. 180/311
2001/0027890 A1 * 10/2001 Bria et al. .............. 180/291

FOREIGN PATENT DOCUMENTS

JP 2001-213377 8/2001

* cited by examiner

*Primary Examiner*—Eric Culbreth
(74) *Attorney, Agent, or Firm*—Keating & Bennett, LLP (57) ABSTRACT

An all terrain vehicle has necessary rigidity despite a split-type body frame being used. A body frame is split into front and rear subframes along a front-to-rear direction of the vehicle, the subframes being detachably linked to each other via bolts. An upper linking section between the subframes is disposed between an engine upper suspension section for suspending an upper portion of an engine unit and an engine rear suspension section for suspending a rear portion of the engine unit.

8 Claims, 10 Drawing Sheets

ALL TERRAIN VEHICLE

BACKGROUND OF THE INVENTION

1. Field of the Invention

The present invention relates to an all terrain vehicle, and more particularly to a split structure for ensuring rigidity of a split-type body frame.

2. Description of the Background Art

There is a type of body frame for a motorcycle which is split into front and rear parts, as disclosed in, for example, Japanese Laid-Open Patent Publication No. 2001-213377. In this conventional body frame, a main frame is split into a front body and a rear body, such that an upper end of the rear body and a rear end of the front body are bolted together.

This conventional body frame has a problem associated with rigidity of the body frame because the front and rear bodies are secured to each other by merely bolting together a rear end of the front body and an upper end of the rear body, with such bolting being used at only one site at each of the right and left sides.

SUMMARY OF THE INVENTION

In order to overcome the problems described above, preferred embodiments of the present invention provide an all terrain vehicle which has a necessary rigidity in the case where a split-type body frame is used.

According to a preferred embodiment of the present invention, an all terrain vehicle includes a double cradle-type body frame including right and left frame members of a cradle type which are integrally coupled via a plurality of cross members, an engine unit which is suspended from the body frame, and a rear arm which is supported at a rear portion of the body frame so as to be capable of moving up and down. The body frame is split into a plurality of subframes along a front-to-rear direction of the vehicle, the subframes being detachably linked to each other via a bolt. A linking section between the plurality of subframes is disposed between an engine upper suspension section for suspending an upper portion of the engine unit and an engine rear suspension section for suspending a rear portion of the engine unit.

In accordance with a preferred embodiment of an all terrain vehicle of the present invention, a linking section is provided between an upper suspension section and a rear suspension section of an engine unit. As a result, in a bypass manner, the engine unit (which can generally be regarded as a rigid body) links together the upper portion and the rear portion of the split frame, between which the linking section is interposed. Thus, according to preferred embodiments of the present invention, any decrease in rigidity due to the splitting of the split-type body frame at the splitting sites can be compensated by the high rigidity of the engine unit itself, thus making for an increased rigidity of the entire body frame.

These and other elements, features, aspects, characteristics and advantages of the present invention will be further described in the following detailed description of preferred embodiments of the present invention when taken in conjunction with the accompanying drawings.

DETAILED DESCRIPTION OF PREFERRED EMBODIMENTS

Hereinafter, preferred embodiments of the present invention will be described with reference to the accompanying figures.

FIGS. 1 to 10 are illustrations of an all terrain vehicle according to a preferred embodiment of the present invention. In the present preferred embodiment, any reference to a direction or side such as "front", "before", "rear", "behind", "right", or "left" indicates such a direction or side as viewed by a rider who is seated on a seat of the vehicle.

Throughout the figures, reference numeral 1 denotes an all terrain vehicle, which is generally structured as follows. At the front end of a double-cradle-type body frame 2, right and left front wheels 3 are supported at the right and left sides, so as to be capable of moving up and down, respectively via right and left front wheel suspension devices 4. Each of the right and left front wheels 3 preferably has a low-pressure and wide balloon tire attached thereon. At the rear end of the body frame 2, right and left rear wheels 5 which are similar to the front wheels 3, are supported via a rear wheel suspension device 6 so as to be capable of moving up and down. In a cradle of the body frame 2, an engine unit 7 is mounted. A fuel tank 8 is mounted above the engine unit 7. At the front of the fuel tank 8, a steering rod 9 with which to steer the right and left front wheels 3 is mounted so as to be capable of pivoting right or left. Steering handles 10 are affixed to an upper end of the steering rod 9. Behind the fuel tank 8 is mounted a seat 11. Furthermore, a front cover 12 is arranged so as to cover the steering rod 9 at the front. The right and left sides of the fuel tank 8 and the lower right and left sides of the seat 11 are covered by a side cover 13. Furthermore, right and left front fenders 14 are mounted respectively above the right and left front wheels 3, and right and left rear fenders 15 are mounted respectively above the right and left rear wheels 5.

Each front wheel suspension device 4 supports each front wheel 3 via upper and lower front arms 4a, which in turn are supported from a front portion of the body frame 2 so as to be capable of moving up and down. A cushion unit 4b is located between the body frame 2 and the lower front arms 4a.

The rear wheel suspension device 6 supports each rear wheel 5 via a rear arm 6a, which in turn is supported by a rear portion of the body frame 2 so as to be capable of moving up and down. A cushion unit 6b is located between the rear arm 6a and the body frame 2, in a middle position along the vehicle width direction.

Figure 1:
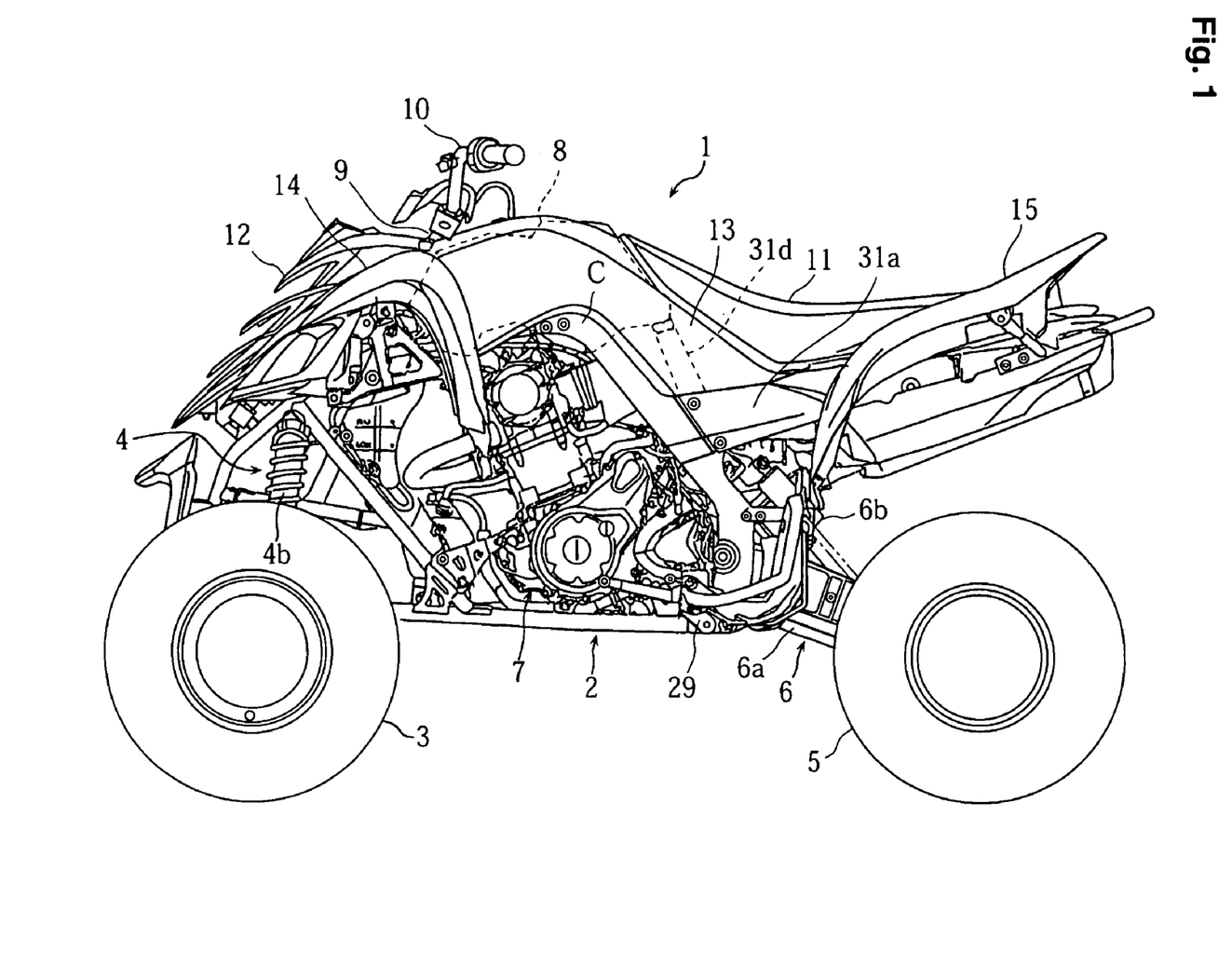
FIG. 1 is a side view of an all terrain vehicle for illustrating a preferred embodiment of the present invention.
Figure 2:
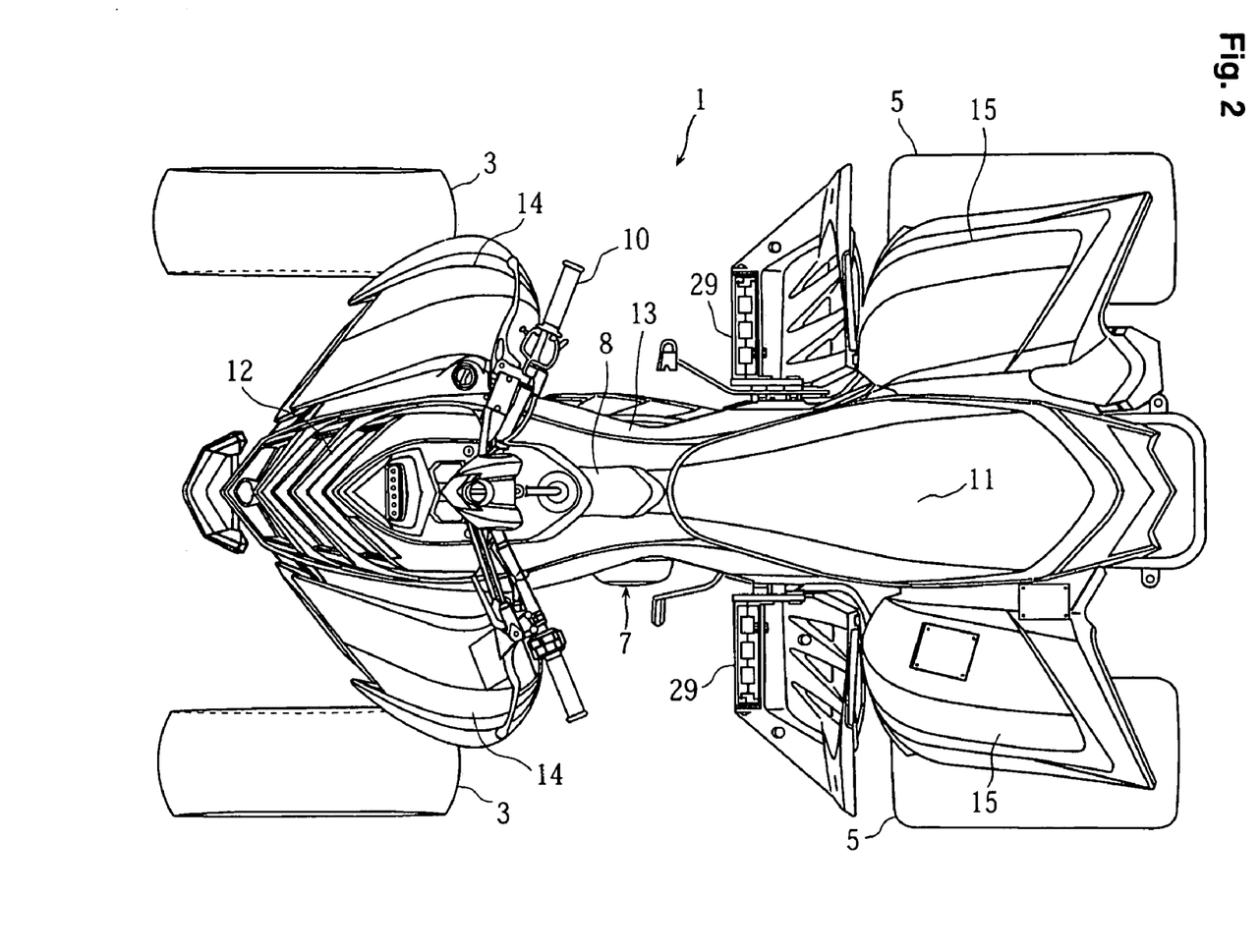
FIG. 2 is an upper plan view of the all terrain vehicle shown in FIG. 1.
Figure 3:
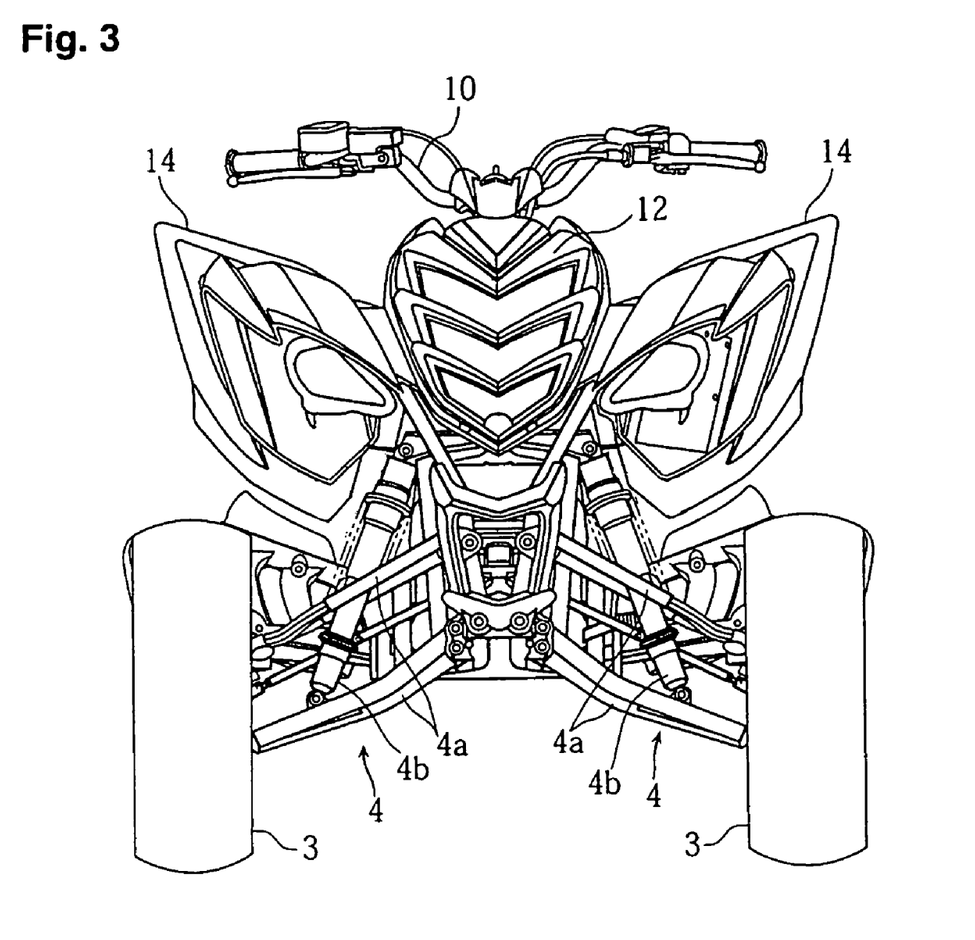
FIG. 3 is a front elevational view of the all terrain vehicle shown in FIG. 1.
Figure 4:
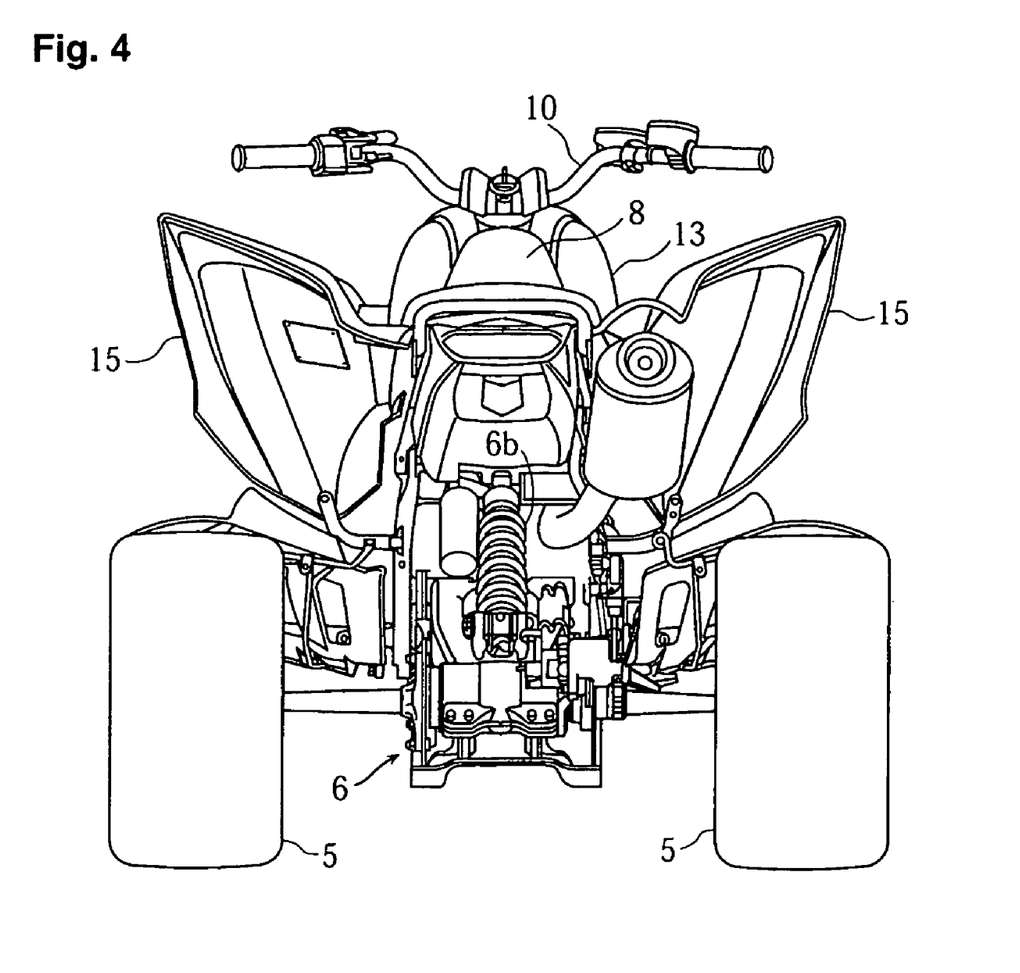
FIG. 4 is a rear view of the all terrain vehicle shown in FIG. 1.
Figure 5:
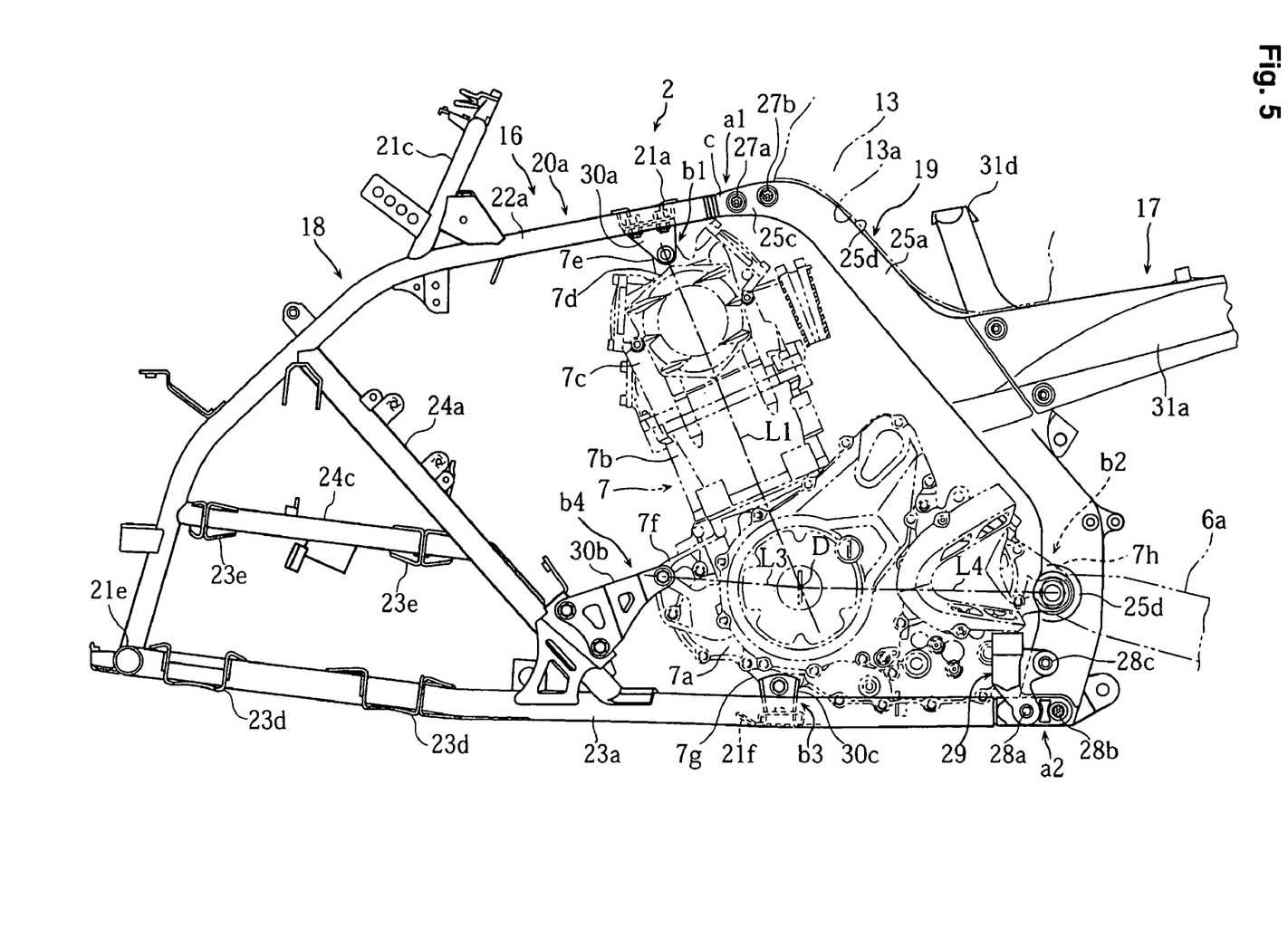
FIG. 5 is a side view of a body frame of the all terrain vehicle shown in FIG. 1.
Figure 6:
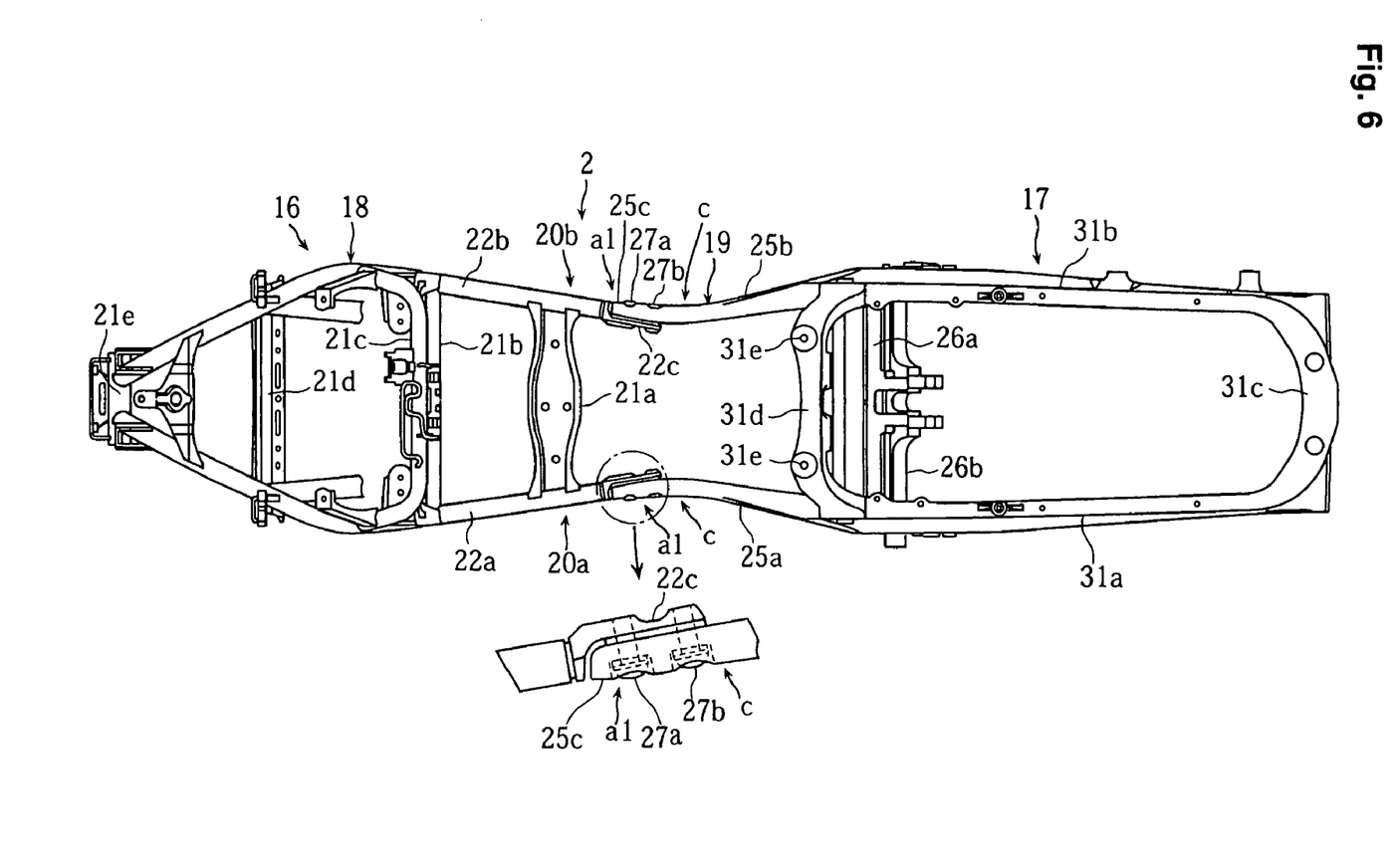
FIG. 6 is an upper plan view of the body frame shown in FIG. 5.
Figure 7:
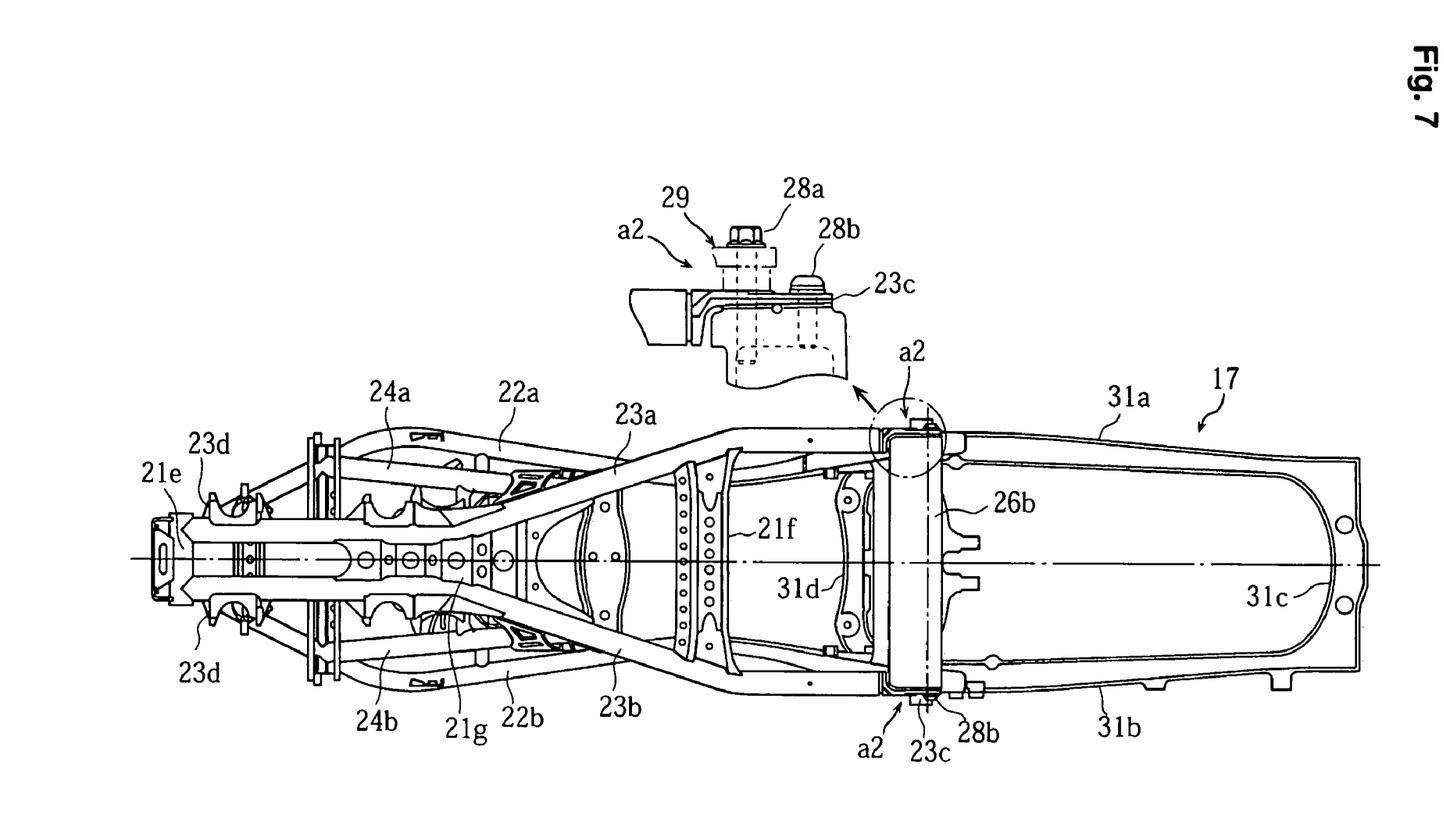
FIG. 7 is a bottom view of the body frame shown in FIG. 5.
Figure 8:
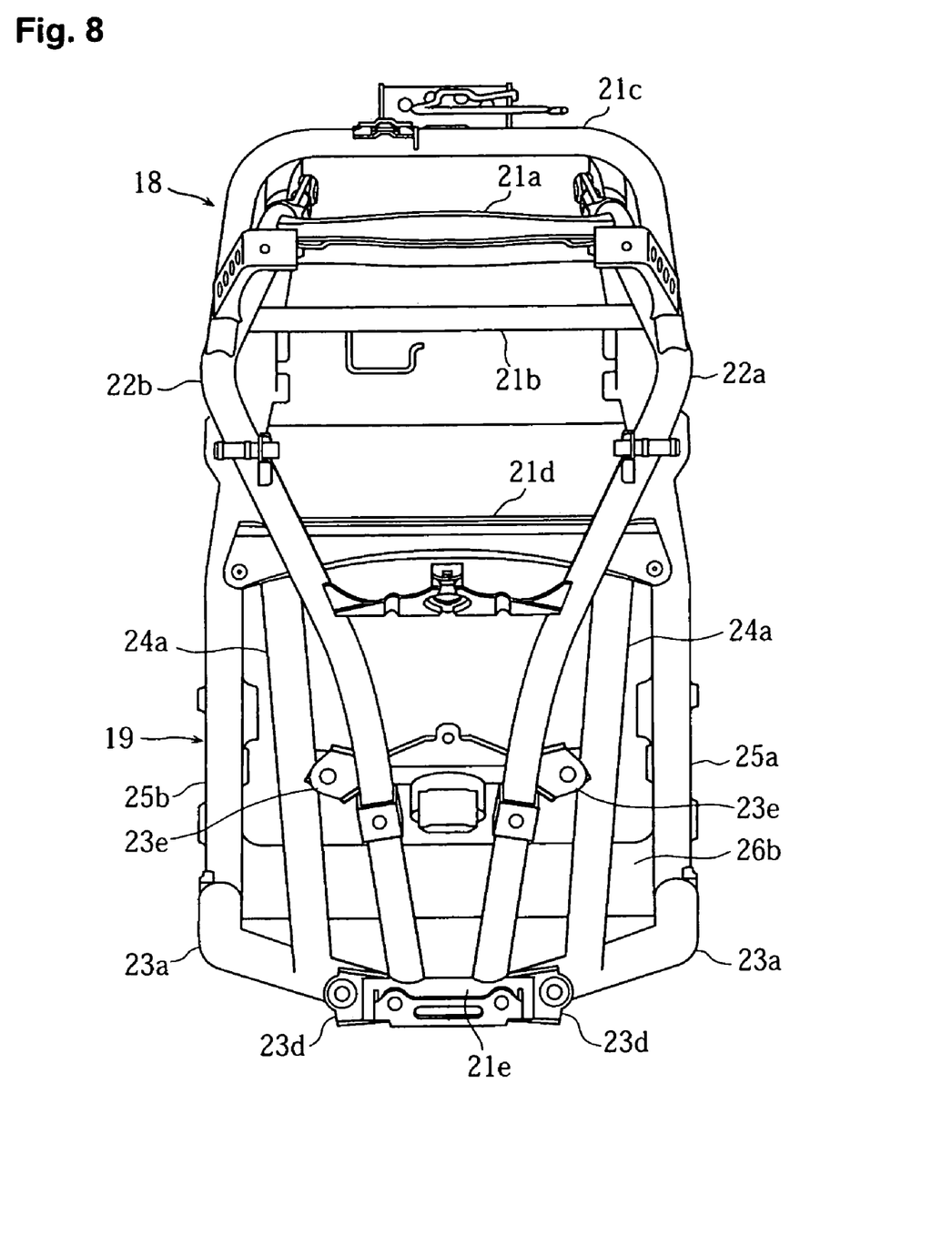
FIG. 8 is a front elevational view of the body frame shown in FIG. 5.

The body frame 2 preferably includes a main frame 16 which suspends the engine unit 7, and a seat rail 17 which supports the seat 11. The main frame 16 is preferably a double cradle-type, including left and right frame members 20a, 20b which are held together by being welded to cross members 21a to 21g. When viewed from either side, as shown in FIG. 5, the main frame 16 has a cradle (loop) shape. When viewed from above, as shown in FIG. 6, the main frame 16 is curved toward the inside along the vehicle width direction, such that a portion which is positioned slightly to the rear of the center along the front-to-rear direction is narrower than the portions which are positioned closer to the front and to the rear of that portion. When viewed from below, as shown in FIG. 7, the rear half is broader, and the front half is narrower, such that the interspace between the sides becomes gradually narrower toward the front. Note that the area of the rear of the narrow curved portion of the main frame 16 defines a so-called knee grip section C to be held between the knee portions of a rider who is seated at the seat 11.

The main frame 16 is divided into a front subframe 18 and a rear subframe 19. The front subframe 18 is preferably composed of steel pipes, and includes front upper frame members 22a, 22b and front lower frame members 23a, 23b on the left and right sides. The front upper frame members 22a, 22b are tilted so as to become lower toward the front, and form a narrower interspace toward the front. Each of the front lower frame members 23a, 23b defines a horizontal side portion which extends substantially horizontally along the front-to-rear direction.

Areas of the split ends of the front upper frame members 22a, 22b are held together by being welded to a cross member (front cross member) 21a, which is preferably composed of a plate metal extending along the vehicle width direction. The front ends of the front upper frame members 22a, 22b are held together preferably by being welded to a cross member 21e. Furthermore, the portions of the front upper frame members 22a, 22b which lie between the cross members 21a and 21e are held together preferably by being welded to the cross members 21b to 21d. On the other hand, the front ends of the front lower frame members 23a, 23b are held together by being welded to the cross member 21e. The rear portions of the front lower frame members 23a, 23b are held together by being welded to the cross member 21f. Furthermore, the portions of the front lower frame members 23a, 23b which lie between the cross members 21e and 21f are connected to each other via the reinforcement plate 21g.

Moreover, the left (right) front upper frame member 22a (22b) and the left (right) front lower frame member 23a (23b) are held together, at their substantially central portions along the front-to-rear direction, preferably by being welded to a left (right) down tube 24a (24b) which is tilted so as to descend from the front to the rear. Furthermore, the rear end of an arm support pipe 24c is connected to the down tube 24a (24b) at an intermediate portion of the down tube, and the front end of the arm support pipe 24c is welded to a front portion of the front upper frame member 22a (22b). The cradle which is defined by the left and right frame members 20a, 20b is subdivided by the down tubes 24a, 24b into front and rear cradles, such that the engine unit 7 is accommodated within the rear cradle.

Note that the front wheel suspension devices 4 are supported by the front cradle. Specifically, the lower front arms 4a are received by brackets 23d which are located at a front portion of the front lower frame members 23a, 23b. The upper front arms 4a are received by brackets 23e, 23e which are disposed on the arm support pipes 24c provided thereabove.

The rear subframe 19, which is preferably composed of a cast aluminum alloy, includes vertical side portions 25a, 25b extending substantially along the top-to-bottom direction. The vertical side portions 25a, 25b are integrally coupled by an upper cross section (rear cross member) 26a, which is located at a substantially central position along the top-to-bottom direction, and a lower cross section 26b, which is located at the lower end. As viewed from either side of the vehicle, each of the vertical side portions 25a, 25b of the rear subframe 19 is shaped so as to slightly overhang, obliquely forwardly from the upper cross section 26a, and has an upper end 25c which is bent further forward. Midway down the respective rear surfaces of the overhangs, seat rail attachment boss sections 26e are integrally formed. On the rear surface of the upper cross section 26a, at a central position along the vehicle width direction, a cushion boss section 26c for receiving an upper end of the cushion unit 6b is integrally formed. On the rear surface of the lower cross section 26b, at a central position along the vehicle width direction, a link support boss section 26d to which a link mechanism of the rear wheel suspension device 6 is coupled is integrally formed.

Figure 9:
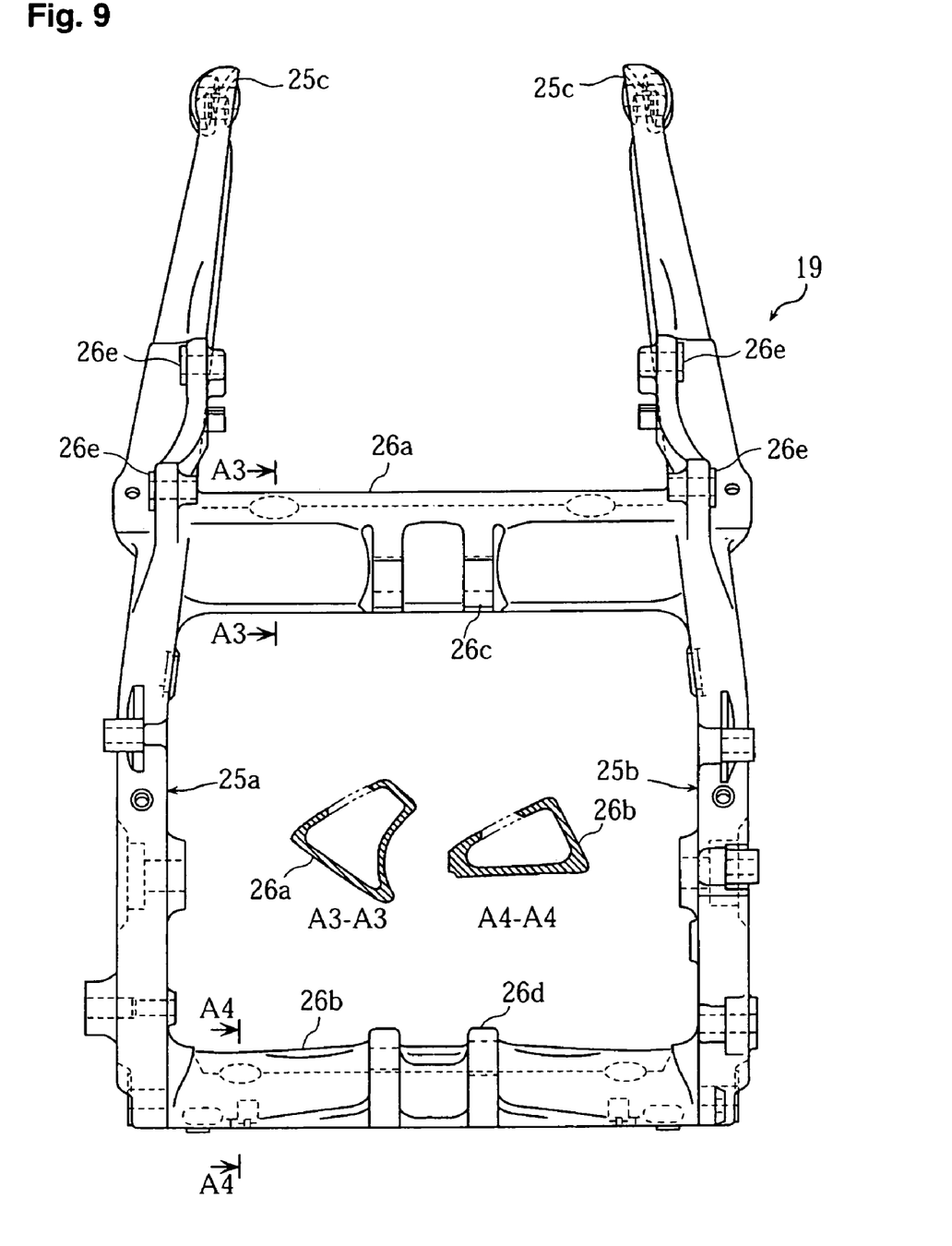
FIG. 9 is a rear view of a rear subframe of the body frame shown in FIG. 5.
Figure 10:
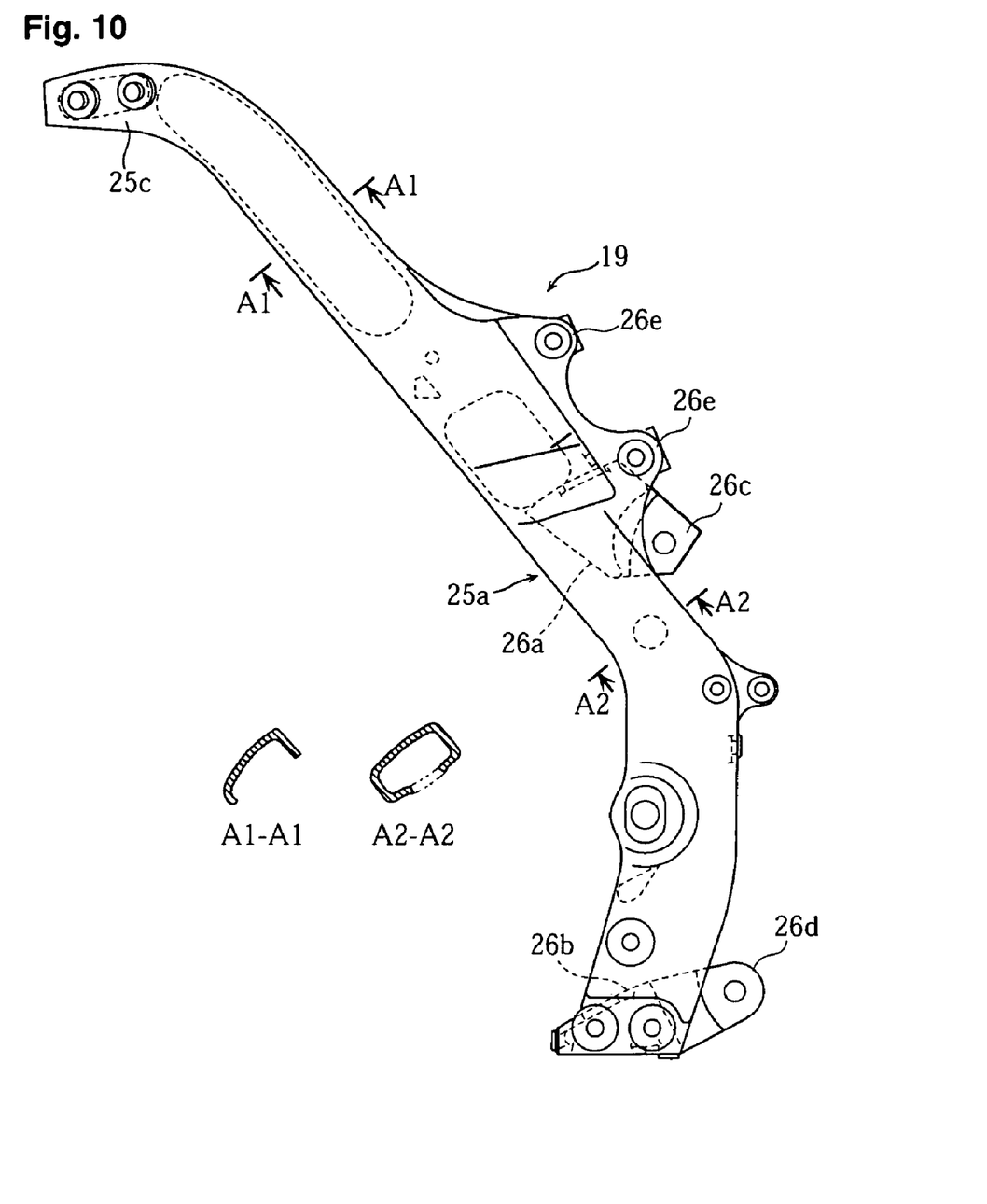
FIG. 10 is a side view of the rear subframe shown in FIG. 9.

Note that the vertical side portions 25a, 25b and the upper and lower cross sections 26a, 26b each have a fundamentally closed cross section, with apertures and holes formed in appropriate places (see A1-A1 and A2-A2 in FIG. 10; and A3-A3 and A4-A4 in FIG. 9). Since the rear subframe 19 is preferably composed of a cast aluminum alloy, apertures and holes can be formed in an otherwise closed cross section in accordance with the required mechanical strength, so that the weight of the body frame can be reduced while maintaining the required mechanical strength.

The front subframe 18 and the rear subframe 19 are detachably linked to each other, preferably by being bolted together at right and left upper linking sections a1 and at right and left lower linking sections a2. The upper linking sections a1 are located near the rear of the narrow knee grip section C which is curved toward the inside along the vehicle width direction of the body frame 2. Each upper linking section a1 includes a plate-like connection flange section 22c which is positioned on the inner side (along the vehicle width direction) of the rear end of the front upper frame member 22a (22b) of the front subframe 18. To the connection flange section 22c, the upper end 25c of the vertical side portion 25a (25b) of the rear subframe 19 is abutted on the outside, and two bolts 27a, 27b are tightened from the outside, thus linking the two subframes together. It will be appreciated that each connection flange section 22c may alternatively be positioned on the outside along the vehicle width direction, and the upper end 25c may be abutted on the inside. Since the corresponding body cover 13 is positioned in the laterally forward direction and in the upper vicinity of each upper linking section a1, when the rider rides the vehicle, the rider's legs are unlikely to come in contact with the upper linking sections al. Therefore, even if the heads of the bolts 27a, 27b protrude from the rear subframe 19 toward the outer sides, ridability is not substantially affected. Moreover, when the vehicle is viewed from either side, the upper linking sections a1 are obscured by the body covers 13, thus improving its aesthetic appeal.

Over a portion extending from the seat rail attaching section on the vertical side portion 25a of the rear subframe 19 to the knee grip section C, a front edge 13a of the side cover 13 is arranged so as to follow along and be substantially flush with a rear edge 25d of the vertical side portion 25a. The same is also true to the other side of the vehicle not shown in FIG. 5.

Each lower linking section a2 preferably includes a plate-like connection flange section 23c which is positioned on the outer side (along the vehicle width direction) of the rear end of the front lower frame member 23a (23b) of the front subframe 18. The connection flange section 23c is abutted, on the outside, to the lower cross section 26b connecting between the vertical side portions 25a, 25b of the rear subframe 19, and two bolts 28a, 28b are tightened from the outside, thus linking the two subframes together at the lower portions.

A footrest 29 is attached to each lower linking section a2. The footrest 29 is abutted, on the outside, to the flange section 23c of the lower linking section a2. The footrest 29 is fastened by the bolt 28a used for the lower linking section a2, and is also affixed to the outer surface of a lower end of the vertical side portion 25a (25b) by a bolt 28c.

The engine unit 7 is generally structured as follows. A transmission case including a transmission mechanism is integrally formed at a rear portion of the engine unit 7. A cylinder block 7b, a cylinder head 7c, and a head cover 7d are stacked and bolted to an upper wall of a front portion of a crankcase 7a which accommodates a crankshaft. The engine unit 7 can generally be regarded as a rigid body, and is hardly deformed by usual external force.

The engine unit 7 is preferably suspended from the body frame 2, via an upper suspension section b1, a rear suspension section b2, a lower suspension section b3, and a front suspension section b4. The upper suspension section b1 is constructed so as to allow an upper suspension boss section 7e, which is integrally formed on an upper surface of the head cover 7c, to be suspended from the cross member 21a via a bracket 30a. The rear suspension section b2 is constructed so as to allow a pivot section 7h, which is integrally formed on a rear wall of the crankcase 7a, to be suspended from a rear arm pivotal supporting section 25d of the vertical side portion 25a. The lower suspension section b3 is constructed so as to allow a bottom suspension boss section 7g, which is integrally formed on a bottom wall of the crankcase 7a, to be suspended from the cross member 21f via a bracket 30c. The front suspension section b4 is constructed so as to allow a front suspension boss section 7f, which is integrally formed on a front wall of the crankcase 7a, to be suspended from the area of the lower end of the down tube 24a via a bracket 30b.

The upper suspension section b1 is located substantially on a cylinder axis line L1 of the engine. The lower suspension section b3 is located substantially under the crankshaft D. The front and rear suspension sections b4, b2 are located on a horizontal line extending through the crankshaft D. Specifically, the suspension sections b4, b2 are disposed so that a line L3 connecting the front suspension section b4 and the crankshaft D is substantially at 180° with respect to a line L4 connecting the crankshaft D and to the rear suspension section b2.

The upper linking section a1 is located near the rear of the upper suspension section b1 for the engine unit 7. Thus, the engine unit 7 links the front subframe 18 and the rear subframe 19 while bypassing the upper linking section a1.

The seat rail 17 is arranged to support the load which acts on the seat 11, e.g., the weight of the rider. The seat rail 17 is detachably mounted to the seat rail attachment boss sections 26e, which are disposed at substantially central portions (along the top-to-bottom direction) of the vertical side portions 25a, 25b. Thus, each upper linking section a1 is located between the upper suspension section b1 and the point at which the seat rail 17 is attached to the vertical side portion 25a or 25b.

The seat rail 17 is preferably made of a cast aluminum alloy, and has a generally rectangular shape when viewed from above. The seat rail 17 preferably includes right and left lateral side portions 31a, 31b which extend along the front-to-rear direction, a rear side portion 31c for coupling the rear ends of the right and left lateral side portions 31a, 31b, and a front side portion 31d for coupling the front ends of the right and left lateral side portions 31a, 31b. The front side portion 31d is curved upright in the shape of a gate, with support boss sections 31e being formed on an upper surface thereof. The support boss sections 31e support a rear portion of the fuel tank 8.

In accordance with the all terrain vehicle 1 of the present preferred embodiment, the main frame 16 is split into two parts, i.e., the front subframe 18 and the rear subframe 19, which are linked together using bolts, or other suitable connecting or fastening elements. This allows different materials with different properties to be used for the subframes 18, 19. For example, the front subframe 18 may preferably be composed of steel pipes, while the rear subframe 19 may preferably be composed of a cast aluminum alloy, or vice versa. As compared to the case where both subframes 18, 19 are connected by welding or the like, greater freedom in design, such as material selection and shape, can be achieved.

By composing the front subframe 18 of steel pipes, for example, it becomes easy to obtain mechanical strength/rigidity. By composing the rear subframe 19 of a cast aluminum alloy, for example, an increased freedom for designing the shape of the rear subframe 19 is obtained, and the number of component parts and weight of the of the rear subframe 19 can be reduced.

In the present preferred embodiment, the front subframe 18 and the rear subframe 19 are preferably linked together by using bolts, or other fastening elements, at the upper linking section a1 and the lower linking section a2, such that the upper linking section a1 is located between the upper suspension section b1 and the rear suspension section b2 of the engine unit 7. Thus, in a bypass manner, the engine unit 7 (which can generally be regarded as a rigid body) links together the upper portion and the lower portion of the split frame (i.e., the front subframe 18 and the rear subframe 19), between which the upper linking section a1 is interposed. As a result, any decrease in rigidity due to the splitting of the split-type body frame 2 can be compensated by the rigidity of the engine unit 7 itself, thus providing for an increased rigidity of the entire body frame.

The upper linking section a1 is located near the upper suspension section b1 of the engine unit 7, the upper suspension section b1 being provided on the cross member 21a, which links together the right and left frame members. This allows the upper suspension section b1 to function to more effectively reinforce the upper linking section a1 between the subframes 18, 19, whereby the rigidity of the split frame can be further enhanced with the rigidity of the engine unit itself.

Furthermore, each of the left and right frame members 25a, 25b of the rear subframe 19 is has an overhanging shape from the upper cross section 26a toward the upper linking section a1, such that the overhang portions appear bulging from the inside as viewed in a transverse cross section. Therefore, the overhang portions have a smaller rigidity along the vehicle width direction than that of any other portion, so that the overhang portions are capable of slight elastic deformation along the vehicle width direction. When the rear subframe 19 is linked to the front subframe 18, this makes it possible to absorb the dimensional errors, if any, between the linking sections of the subframes. As a result, the assembling of the subframes is facilitated.

The narrow knee grip section C is provided at a portion which is located slightly to the rear of the center along the front-to-rear direction of each of the left and right frame members 20a, 20b of the body frame, such that the upper linking section a1 is also located at this portion. Furthermore, the front edge 13a of the side cover 13 is shaped so as to follow along and be substantially flush with the rear edge 25d of the knee grip section. Therefore, when the rider performs a so-called "knee grip" action, the rider is unlikely to feel awkward around the knees due to any level difference between each frame and cover, thus making for improved knee grip capabilities. Since there is no level difference at the boundary between each frame and cover, any action of the rider, such as shifting of the center of gravity of the rider's body, can be smoothly performed.

Each lower linking section a2 is constructed by bolting together the rear end of the horizontal side portion of the front subframe 18 and the lower end of the vertical side portion 25a or 25b of the rear subframe 19. The footrest 29 is disposed on the lower linking section a2 as such, the footrest 29 being fastened with the bolt 28a which is used for the lower linking section a2. As a result, the number of bolts provided exclusively for attachment of the footrests 29 can be reduced.

Since each footrest 29 is not only concurrently fastened with the bolt 28a used for the lower linking section a2 but also affixed to the vertical side portion 25a with the further bolt 28c, a higher supporting strength is obtained for the footrest 29, so that the load acting on the footrests 29, e.g., the weight of the rider, can be securely supported. Each footrest 29 also functions as a reinforcement bracket for connecting the rear end of each horizontal side portion to the lower end of the vertical side portion 25a or 25b, thus enhancing the linking strength of each lower linking section a2.

When viewed from above, the seat rail 17 preferably has a generally rectangular shape and includes the right and left lateral side portions 31a, 31b, the rear side portion 31c, and the front side portion 31d, such that the front ends of the right and left lateral side portions 31a, 31b are respectively linked to the left and right vertical side portions 25a, 25b of the rear subframe 19. As a result, the seat rail 17 has a high rigidity along the vehicle width direction, thus enhancing the rigidity of the main frame 16 especially along the vehicle width direction.

Moreover, the upper linking section a1 is disposed between the engine upper suspension section b1 and the seat rail attaching section, i.e., the section of the rear subframe 19 at which the seat rail 17 is attached to the rear subframe 19. As a result, the rigidity enhancement effect provided by the seat rail 17 is also extended to the linking rigidity of the front and rear subframes 18, 19.

Although the above-described preferred embodiment illustrates an example where the body frame 2 is split into two parts (i.e., front and rear), it will be appreciated that the body frame of the present invention may be split into three or more parts.

Although the above-described preferred embodiment illustrates an example where the front subframe is preferably composed of steel pipes and the rear subframe is preferably composed of a cast aluminum alloy, the split frame of the present invention is not limited to such materials and production methods.

Although the above-described preferred embodiment illustrates an example where each upper linking section a1 is disposed near the upper suspension section b1 of the engine, the positions of the linking sections according to the present invention are not limited thereto. Rather, the present invention encompasses any arrangement where linking sections are disposed between the upper suspension section b1 and the rear suspension section b2 of an engine so that the high rigidity of the engine unit itself is utilized to compensate any decrease in rigidity due to the splitting of the frame at the splitting sites.

Although the above-described preferred embodiment illustrates an example where the rear suspension section b2 doubles as a rear arm supporting section, it will be appreciated that the rear suspension section does not need to double as a rear arm supporting section, but instead may be disposed above or below a rear arm supporting section.

While the present invention has been described in detail, the foregoing description is in all aspects illustrative and not restrictive. It is understood that numerous other modifications and variations can be devised without departing from the scope of the invention.

What is claimed is:

1. An all terrain vehicle comprising:
    a double cradle body frame including right and left frame members which are integrally coupled via a plurality of cross members;
    an engine unit which is suspended from the body frame; and
    a rear arm which is supported at a rear portion of the body frame so as to be movable up and down; wherein
    the body frame is split into a front subframe and a rear subframe, and the front and rear subframes are detachably linked together via a fastening element at an upper linking section and a lower linking section;
    the rear subframe includes a vertical side portion extending substantially along a top-to-bottom direction of the vehicle, and an engine rear suspension section is located on the vertical side portion;
    the front subframe includes a horizontal side portion extending substantially horizontally below the engine, and an engine lower suspension section arranged to suspend a lower portion of the engine unit is provided on the horizontal side portion; and
    the lower linking section includes a rear end of the horizontal side portion of the front subframe attached to a lower end of the vertical side portion of the rear subframe via a bolt; and
    a footrest is mounted on the lower linking section, the footrest being concurrently fastened with the bolt used in the lower linking section.

2. The all terrain vehicle according to claim 1, wherein the front subframe is made of steel and the rear subframe is made of a cast aluminum alloy.

3. The all terrain vehicle according to claim 2, wherein a knee grip section is arranged partially along a front-to-rear direction of the right and left frame members of the body frame, the knee grip section being curved inwardly along a width direction of the vehicle so that, when viewed from above, the knee grip section appears narrower than portions before and behind the knee grip section, and the upper linking section is disposed near the knee grip section.

4. The all terrain vehicle according to claim 2, wherein a body cover is arranged so that an edge of the body cover follows along the rear subframe, and the right and left frame members of the rear subframe are substantially flush with the edge of the body cover.

5. The all terrain vehicle according to claim 2, wherein a seat rail arranged to support a seat is detachably mounted to the rear subframe, and the upper linking section is disposed forward of a seat rail attaching section of the rear subframe at which the seat rail is attached to the rear subframe.

6. The all terrain vehicle according to claim 5, wherein the seat rail includes right and left lateral side portions extending along the front-to-rear direction, a front side portion arranged to couple front ends of the right and left lateral side portions together, and a rear side portion arranged to couple rear ends of the right and left lateral side portions together, and the right and left lateral side portions, the front side portion, and the rear side portion are integrally coupled so as to form a generally rectangular shape when viewed from above.

7. The all terrain vehicle according to claim 6, wherein right and left frame members of the front subframe are integrally coupled to each other via a front cross member at portions near the upper linking section, and right and left frame members of the rear subframe are integrally coupled to each other via a rear cross member at portions near the seat rail attaching section, the right and left frame members of the rear subframe extending in an overhanging manner from the rear cross member toward the upper linking section, the right and left frame members of the front and rear subframes forming the right and left frame members of the body frame " in order to avoid double inclusion (i.e. to clarify that the subframe members are not members on the invention in addition to the body frame right and left members).

8. The all terrain vehicle according to claim 1, wherein the upper linking section is disposed behind an engine upper suspension section arranged to suspend an upper portion of the engine unit, and between the engine upper suspension section and the engine rear suspension section.

* * * * *